Aug. 18, 1942. H. A. CENTERVALL Re. 22,159

ROTARY PUMP OR MOTOR

Original Filed April 13, 1934 3 Sheets-Sheet 1

INVENTOR.
Hugo A. Centervall
BY
Pennie, Davis, Marvin & Edmonds
his ATTORNEYS

Aug. 18, 1942. H. A. CENTERVALL Re. 22,159

ROTARY PUMP OR MOTOR

Original Filed April 13, 1934 3 Sheets-Sheet 2

INVENTOR.

Hugo A. Centervall

BY

Pennie, Davis, Marvin and Edmonds

HIS ATTORNEYS

ROTARY PUMP OR MOTOR

Original Filed April 13, 1934 3 Sheets-Sheet 3

INVENTOR.
Hugo A. Centervall
BY
Pennie, Davis, Marvin & Edmonds
his ATTORNEYS

Reissued Aug. 18, 1942

Re. 22,159

UNITED STATES PATENT OFFICE 22,159

ROTARY PUMP OR MOTOR

Hugo A. Centervall, Roselle, N. J., assignor to Manly Corporation, New York, N. Y., a corporation of Delaware Original No. 2,141,170, dated December 27, 1938, Serial No. 720,418, April 13, 1934. Renewed June 19, 1937. Application for reissue December 24, 1940, Serial No. 371,599

34 Claims. (Cl. 103—120)

This invention relates to improvements in rotary type fluid pumps or motors, and the invention is concerned more particularly with pumps or motors of this sort in which the rotor is provided with a plurality of vanes which are suitably mounted and arranged to move outwardly and inwardly thereof during the operation of the device, for example, in a general radial direction.

Such pumps or motors may be used with either an elastic fluid such as air or steam, or with liquids. Perhaps, however, the most general commercial applications are as hydraulic devices, and the pump or motor of the present invention will be described in connection with such application, although it will be understood that it is also capable of dependable operation with elastic fluids.

There is a large industrial demand for a pump or motor for supplying or operating by a liquid such for example as oil under comparatively high pressures, and rotary pumps and motors of this general type have proved to be industrially and commercially successful. Such pumps and motors, however, have a serious limitation in that it is impossible to control, or vary, their capacity, or output, except by varying the speed of rotation. The principal object of the present invention is to provide a pump or motor of this kind in which the capacity, or output, of the pump or motor at constant speed, or in other words, its capacity per revolution, can be readily controlled or varied while the pump is in operation, and yet retain the simplicity of construction which is necessary for long and dependable service when operated continuously, or intermittently, at pressures employed in modern commercial hydraulic apparatus.

An object of the invention also is to provide such a fluid pump or motor in which the capacity per revolution can be varied in infinitely small increments from the minimum capacity of the pump or motor to the maximum, and which operates with remarkable quietness and freedom from vibration and wear at all capacities and pressures within the intended range of operation.

Another object of the invention is to provide a fluid pump or motor of this kind which is compact, comprises a comparatively small number of parts, and is constructed so that it is relatively inexpensive to manufacture. Other and more specific objects will appear from the description which follows.

The invention will be understood from a consideration of the accompanying drawings which illustrate, by way of example, an embodiment of the invention in a pump of variable capacity in which the vanes move outwardly and inwardly of the rotor in a substantially radial direction.

Figure 2:
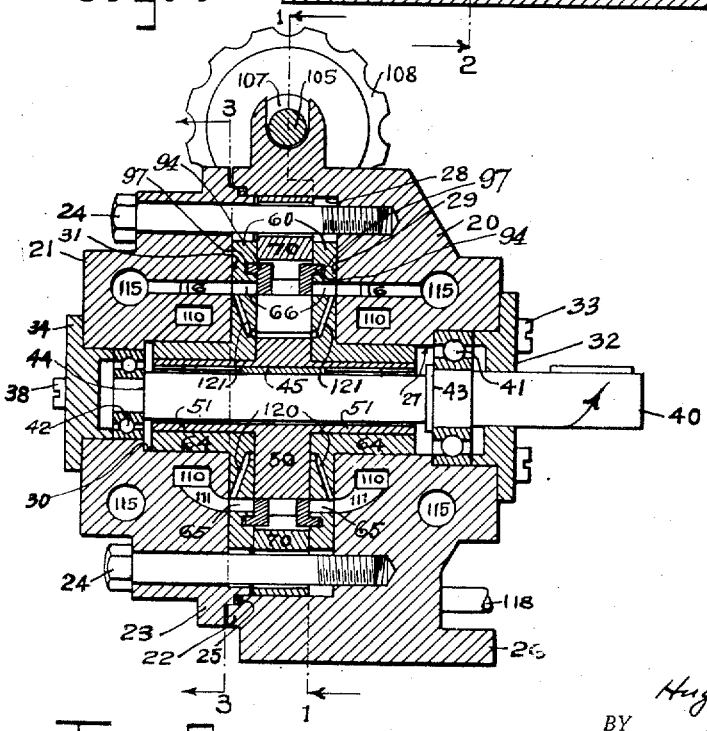
Fig. 2 is a longitudinal view, partly in section, taken along the line 2—2 of Fig. 1.

Referring now to these drawings, as shown in Fig. 2 the enclosing casing includes a forward member 20 and a rear member 21 provided with cooperating flanges 22 and 23 respectively and securely held together as by screws 24, appropriate packing 25 being used to prevent leakage. The pump is supported by a base 26 which in this instance is formed integrally with the casing member 20. The casing member 20 is also formed with a central cylindrical bore 27 whose rear end is enlarged to form the pump cavity 28 having a face 29 at right angles to the bore 27. The rear casing member 21 is likewise formed with a bore 30, in line with the bore 27 of the member 20 and in the present embodiment of the same diameter as said bore 27, and is provided with a face 31 which is parallel to the face 29 of the member 20 and closes the pump cavity 28.

Figure 1:
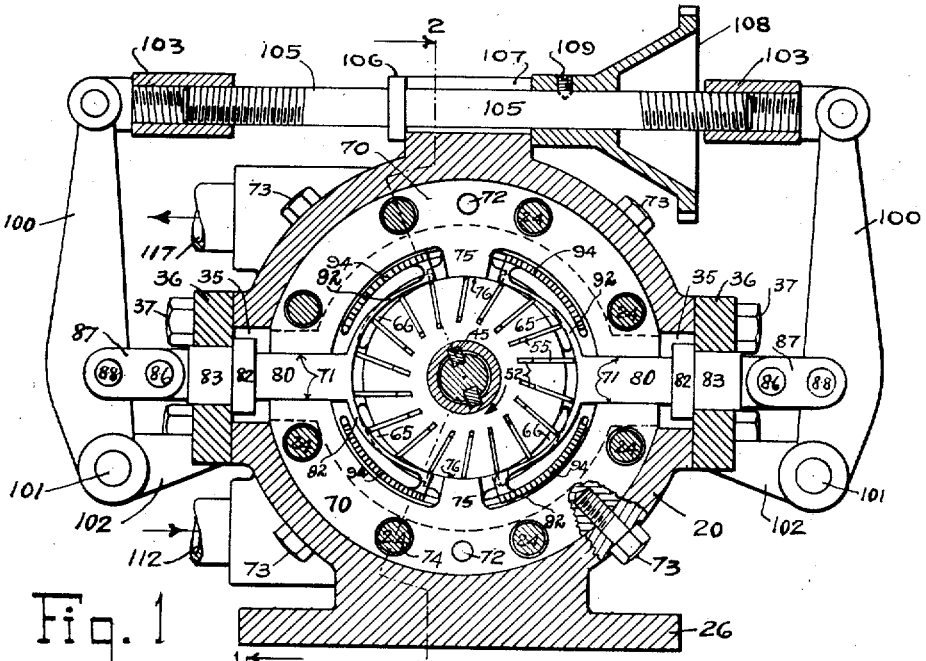
Fig. 1 is a sectional view transverse the axis of rotation taken along the line 1—1 of Fig. 2 looking in the direction of the arrows.
Figure 3:
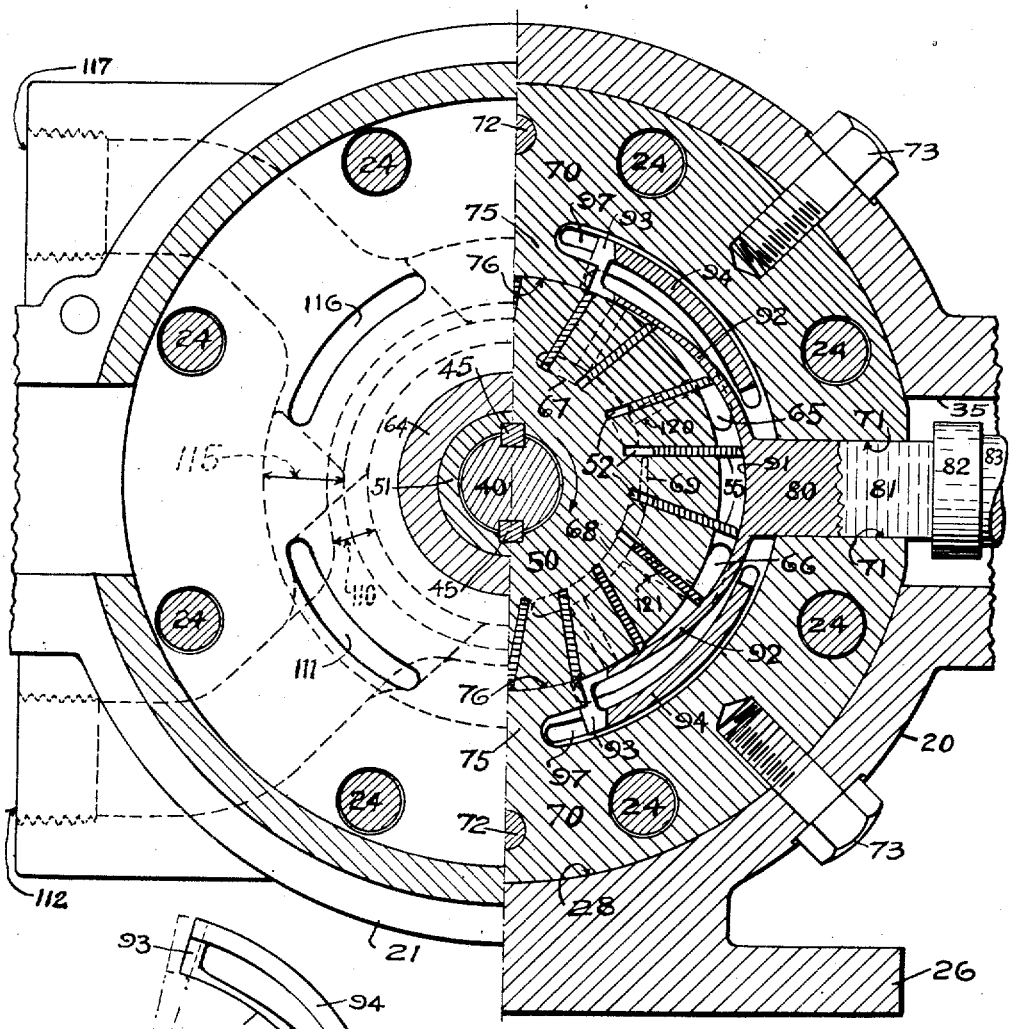
Fig. 3 is an enlarged view, the right hand half being in section taken on the vertical center line of Fig. 2, and the left hand half being in section taken on line 3—3 of Fig. 2 showing the ports and oil passageways in the rear casing member.

The enclosing casing is further provided with a pair of openings 35 of substantially rectangular cross section, each having three sides formed in the casing member 20 and a fourth side formed by the face of the casing member 21. These openings 35 are positioned on opposite sides of and in line with the axis of pump cavity 28, as shown in Figs. 1 and 3, and their outer ends are closed as by cover plates 36 suitably held in place, as by screws 37.

The driving shaft 40 is rotatably supported by the bearing members 41 and 42 respectively and is held against endwise movement by the shoulder 43 which bears against the inner race of the bearing 41 and by the shoulder 44 which bears against the inner race of the bearing 42. The bearing 41 is positioned in the enlarged end portion of the bore 27 and is held against endwise movement by the shoulder formed by the inner end of said enlarged portion, and by the cover member 32 which closes the outer end of said bore 27 and which is suitably held in place as by screws 33. The bearing 42 is similarly positioned in the reduced end portion of the bore 30 and is held against endwise movement by the shoulder 44 on the driving shaft 40 and by the cover member 34 which closes the outer end of the bore 30 and which is suitably held in place, as by screws 38.

Formed on each side of the rotor 50 is a sleeve-like hub 51 extending into the bores 27 and 30 respectively, as shown in Fig. 2, and supported therein in a manner to be later described. The arrangement is such that the rotor 50 is supported by its hubs 51 but is driven by the driving shaft 40 which passes loosely through hollow hubs 51 and is keyed thereto by means of sliding keys 45 which allow the rotor to move lengthwise of the driving shaft.

The rotor 50 is provided with a plurality of conventional slots 52 in each of which is slidably fitted the usual vane 55 of substantially the same width as said rotor 50 and preferably of a length slightly less than that of the slots 52.

Located within the pump cavity 28 is a pair of members 60 (Figs. 2 and 7), hereinafter termed "end plates," one of which is positioned on each side of the rotor 50 (see Fig. 2). Each end plate 60 comprises a disc-like portion 61 which in the present embodiment is of a diameter slightly less than the distance between a diametrically opposed pair of the screws 24, as indicated by the dotted lines in Fig. 1 and as shown in Fig. 2. Each end plate 60 has a pair of short arms or extensions 62 (see Fig. 7) which in the present embodiment are of a width substantially equal to the vertical dimension of the rectangular openings 35, and one of said arms 62 is provided with a suitable drill hole 63 to receive a dowel pin, not shown, which securely and accurately locates the member.

Each end plate 60 also is provided with a hub 64 (see Fig. 2) at right angles to the disc-like portion 61 and fitting snugly within the bores 27 or 30 respectively, as shown in Fig. 2. An appropriate bore to receive the rotor supporting hubs 51 is formed in and extends through each end plate 60 and its hub 64. The disc-like portion 61 of end plates 60 is made of such thickness as to fill the space between the sides of the rotor 50 and the faces 29 and 31 respectively of the pump cavity 28, and the hubs 64 are similarly made of such thickness as to fill the space between the hubs 51 of the rotor 50 and the inner circumferential surfaces of the bores 27 and 30 respectively, as shown in Fig. 2. The arrangement is such as to permit the rotor 50 to rotate freely while forming substantially fluid tight running joints with the cooperating surfaces of the end plates 60.

Figure 8:
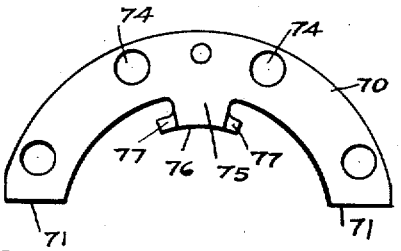
Fig. 8 is a side elevation of another of the members which for convenience is termed the "central distance piece."
Figure 9:
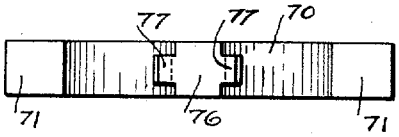
Fig. 9 is a plan view of the central distance piece.
Figure 5:
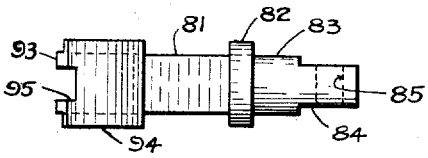
Fig. 5 is a top plan view of the movable abutment and the flexible arms or projections drawn on a smaller scale than that of Fig. 4.
Figure 6:
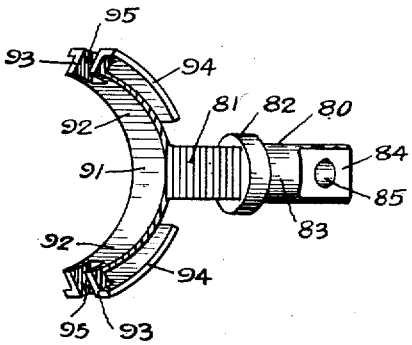
Fig. 6 shows in perspective, other details of construction of the movable abutment and the flexible arms or projections and is drawn on substantially the same scale as that of Fig. 5.

Located within the pump cavity 28 and positioned between the opposing faces of the end plates 60 is a pair of members 70 (Figs. 8 and 9) hereinafter termed "central distance pieces." Each central distance piece 70 comprises a nearly semi-circular segment of a ring whose outer surface is adapted to conform to the bore of the pump cavity 28 and whose inner surface is greater in radius than rotor 50. The ends 71 of the central distance pieces 70 are so formed as to be horizontal, in the present embodiment, when the parts are in position. Each central distance piece 70 is located by a dowel pin 72 fitted into an appropriate drill hole and is securely held in place as by screws 73 projecting inwardly through the enclosing casing 20. The central distance pieces 70 are made of a thickness slightly greater than the thickness of the rotor 50, the arrangement being such that the end plates 60, while pressing against the sides of the central distance pieces 70 so as to prevent the leakage of fluid therebetween, are maintained in such position as to permit the rotor 50 to rotate freely while forming substantially fluid tight running joints therewith as hereinbefore stated. Each central distance piece 70 is likewise provided with drill holes 74 through which pass the screws 24 as clearly shown in Figs. 1 and 2.

The device includes means for dividing the space surrounding the rotor into a plurality of pumping sections, preferably two, each consisting of a working or pumping chamber flanked by inlet and outlet areas. It also includes means comprising a track for the outer edges of the vanes for varying the extent of and for controlling the inward and outward movement of the vanes 55 and which constitute important features of the present invention. In the present embodiment the mechanism for dividing the space surrounding the rotor into two pumping sections includes a pair of fixed abutments 75 here shown as formed integrally with and extending inwardly from the central distance pieces 70 and which in the present instance are positioned respectively above and below the rotor 50 and substantially in line with its vertical center line. Each fixed abutment 75 includes an arcuate surface 76 which in the present embodiment is concentric with the rotor 50 and which cooperates with said rotor 50 and the outer ends of the vanes 55 to separate the fluid areas on opposite circumferential sides or ends of the abutment 75, thus effecting division between the two pumping sections.

The working or pumping chambers, or pumping spaces, of the two pumping sections are formed by means of a pair of members 80, hereinafter termed the movable abutments, one of which is shown in Figs. 3, 4, 5 and 6.

These members 80 are arranged to be conjointly adjustable radially as will be later explained, and the size of the pumping chambers and the volume of fluid delivered by the pump are determined by the distance of the inner ends of these members from the rotor, the pumping chambers being comprised by the spaces between the adjacent vanes which are moving in contact with the inner ends of movable abutments 80. It will be understood that the width of abutments 80 is equal to the distance between the opposing faces of end plates 60 with which they form substantially fluid tight joints. The curved surfaces of the inner ends of these abutments form elements of the vane track, as will be described presently.

Each movable abutment 80 includes a horizontal member comprising a portion 81 of rectangular cross section, having a width equal to the distance between the opposing faces of the arms 62 of the end plates 60, and having a height equal to the distance between the opposing ends 71 of the pair of central distance pieces 70. Each movable abutment 80 is thus supported by its rectangular portion 81 which in turn is supported by the ends 71 of the central distance pieces 70 and the arrangement is such that the movable abutment 80 may be moved any desired amount horizontally with respect to the device while said portion 81 forms a substantially fluid tight joint with the opposing faces of the arms 62 of the end plates 60 and with the surfaces of the ends 71 of said central distance pieces 70.

Outwardly of the rectangular portion 81 is an enlarged portion 82 which acts as a stop, and is hereinafter so termed, limiting the maximum inward and outward movement of the movable abutments 80. Extending outwardly from the stop 82 is a portion 83 which projects through the ends of the openings 35 of the enclosing casing and through appropriate openings in the cover plates 36. Each outer portion 83 is flattened at 84 (Figs. 1 and 3) and drilled at 85 to receive a pin 86 by which each movable abutment 80 is operatively connected with one end of a forked link 87 whose purpose will be explained later.

Each movable abutment 80 carries vane trackway elements 92 which in the present embodiment are of somewhat parabolic shape and formed integrally with the horizontal member already described. The pumping space arc 91, hereinafter termed the "pumping arc," is between the track elements 92. The center of this arc is in line with the horizontal center line of the rotor 50 and with the center of the rectangular portion 81 of the horizontal member of the movable abutment 80.

The vane track includes the curved surfaces 76, the track elements or arms 92, and the pumping arcs 91 of adjustable or movable abutments 80, and forms a continuous track for guiding the outer ends of the vanes as they move, by the rotation of the rotor, between the fixed abutments 75 and the pumping arcs 91, and vice versa.

The pumping arc 91 may be of any desired curvature but is preferably made such as to be concentric with the periphery of the rotor 50 when the movable abutments 80 are in the position of adjustment at which the pump is intended to receive its greatest use; in the present embodiment the pumping arc 91 is concentric with the periphery of said rotor 50 when the movable abutments 80 are midway between their extreme inward and outward position of adjustment. By this arrangement, radial movement of the vanes while subjected to working pressure, that is, while moving across the pumping space arc 91 is kept at a minimum as will be later explained. The pumping arc 91 is also preferably of a length in a circumferential direction equal to or slightly greater than the angular distance between the vanes 55.

The track elements 92 extending from opposite sides of the pumping arc 91 comprise two nonrigid, flexible, or yielding arms or branches projecting integrally from the sides of the movable abutments 80. These arms, in the present instance, are of a width slightly less than the distance between the opposing faces of the end plates 60 in order to permit these arms to move freely and without binding when the output of the pump is altered, and to facilitate fluid connection between and equalize the fluid pressures in the areas adjacent the inner and outer circumferential surfaces of these arm.

Because the arms 92 are integral with movable abutments 80, in the embodiment of the invention illustrated, the surfaces of the inner ends of these arms adjacent each of these abutments are necessarily maintained even with the surfaces of pumping arcs 91. However, in order to obtain proper action and radial movement of the vanes 55 it is necessary also to provide the vane track with means which permit and cause the outer ends of said vanes 55 to pass smoothly and without interruption from the outer ends of arms or track elements 92 onto the arcuate surfaces 76 of the fixed abutments 75 and similarly from said arcuate surfaces 76 onto said arms 92. In the present embodiment this is accomplished by proportioning the parts so that the ends of the arms 92 over-lap with the outer portions of the arcuate surfaces 76 of the fixed abutments 75, and by maintaining the surfaces of said overlapping portions of said arms 92 even with said arcuate surfaces 76 so that said arms 92 have a tangential relation, at or near their ends, to said arcuate surfaces 76. The particular mechanism employed for this purpose in the present embodiment will now be described.

Projecting outwardly from the end of each arm 92 is a substantially rigid member 93 whose outer end is formed integrally with or rigidly attached to an arcuate flange 94; as here shown, the member 93 is positioned radially with respect to said flange 94 and the arcuate surfaces 76 of the fixed abutments 75. The flanges 94 are of greater width than the arms 92, and the outer edges of each of said flanges are adapted to be received in the adjacent pair of arcuate channels 97 formed in the opposing faces of the end plates 60; the channels 97 are of greater length than the flanges 94 and are likewise positioned concentrically with respect to the arcuate surfaces 76 of the fixed abutments 75. The arrangement and fit of the parts is such that the flanges 94 are free to slide in the channels 97 but are at all times held concentric with the arcuate surfaces 76 of the fixed abutments 75.

The end of each arm 92 is provided with a slot 95 (Fig. 6) into which is received a tongue 77 (Figs. 8 and 9) extending circumferentially from and forming part of the arcuate surface 76 of the corresponding fixed abutment 75. The arrangement is such that the tongues 77 extend into the slots 95 and thus overlap the ends of the corresponding arms 92 in all positions of adjustment of the movable abutments 80, and the flanges 94 controlled by the slots 97 maintain at all times substantially tangential or even relation between the surfaces of said arms and the arcuate surfaces 76 of the fixed abutments 75.

There may also be provided means for controlling the relative rates of inward and outward movement, i. e., the radial acceleration and deceleration of the vanes 55. This is accomplished by proper proportioning of the flexible arms 92 of the movable abutments 80 and by exerting upon said arms 92 force in such amount and direction as to cause said arms to assume desired predetermined shape so that the contour of the track surfaces carried by the flexible arms 92 is positively controlled throughout the range of adjustment of the length of the vane track and at all capacities of the pump. The mechanism employed for exerting this force upon the arms 92 may be of any preferred type and may be separate from, combined with, or, as in the present embodiment, integral with the mechanism employed for maintaining the end portions of said arms 92 in line and substantially concentric with the arcuate surfaces 76 of the fixed abutments 75. The flexible arms 92 may, therefore, be made of any desired interior configuration and of any desired thickness; in the present embodiment, however, the arms 92 are made of variable thickness, decreasing in thickness from their ends toward an intermediate point which, in the present instance, is nearer the fixed abutment 75 than the movable abutment 80 as clearly shown in Figs. 3 and 4. With this arrangement, the resistance to deformation or bending is non-uniformly distributed lengthwise along the flexible arms 92, thus contributing to control of their curvature or configuration throughout the range of their adjustment in unison with said movable abutments 80. The interior surfaces of the arms 92 are preferably ground so as to have a configuration adapted to produce vane movement at the desired acceleration and deceleration when no force is exerted upon the arms 92 by the mechanism provided for this purpose.

Figure 4:
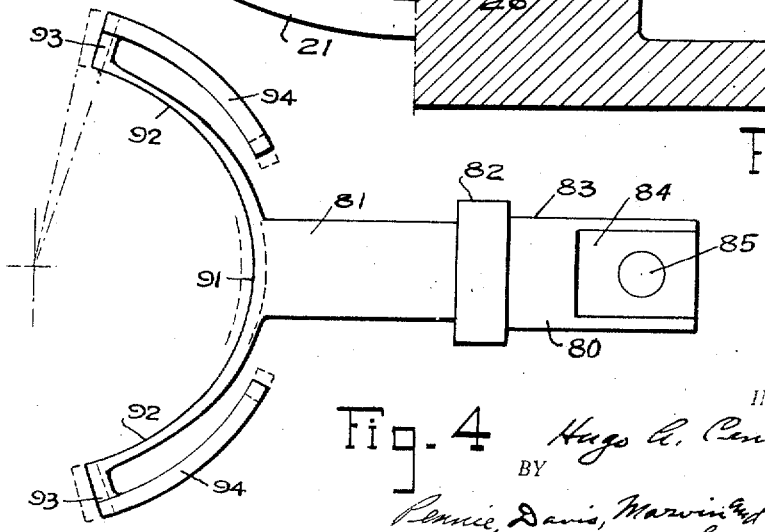
Fig. 4 is an enlarged side elevation drawn on substantially the same scale as that used in Fig. 3, of one of the members, which for convenience is termed the "movable abutment," together with the pair of flexible arms or projections which in the present embodiment are formed integrally therewith.

In the present embodiment the arrangement is such that no force is exerted upon the arms 92 when the movable abutments 80 are midway between their extreme inward and outward positions of adjustment and said arms 92 are ground to have the desired configuration when said movable abutments 80 are in this mid-position, as shown by the full lines of Fig. 4. As hereinbefore stated, at mid-position the pumping arc 91 together with its corresponding pair of arms 92 approximate a parabolic configuration so that the track surface of each arm 92 has a contour such that the curvature of the portion thereof near its end adjacent the fixed abutment 75 is less than the curvature of the portion thereof near its end adjacent the movable abutment 80; or in other words, the radius of curvature of the portion of the track surface near the end of the arm 92 adjacent the fixed abutment 75 has a greater value than that of the portion of its track surface near its end adjacent the movable abutment 80.

As the movable abutments 80 are moved out of their mid-positions the flanges 94 are at the same time moved in one direction or the other in their channels 97, which movement tends to change the angular relation between each member 93 and its arm 92. This change in angular relation imposes on the arms 92 a bending force tending to modify the general deformation thereof obtained from their inward and outward movement in unison with the movable abutments 80; that is to say, inward and outward movement of the flexible arms 92 alters the distance between the outer end of each arm 92 (i. e., the end of the arm 92 to which the member 93 is attached) and the horizontal center line of the pump and of the movable abutment 80, which tends to give said flexible arms 92 a general deformation of one character, and the bending force exerted upon said arms 92 by change in their angular relation with respect to the members 93 and flanges 94 modifies said general deformation. In the present embodiment, this general deformation is modified by a constraining or negative bending force (sometimes for convenience termed a "negative torque") which tends to decrease or flatten the curvature of the flexible arms 92 as the movable abutment 80 and its pair of arms 92 are moved outward from their mid-position; and said general deformation is modified by what may be termed in contrast a "positive" constraining or bending force that increases the curvature of said arms 92 as the movable abutment 80 and its arms 92 are moved inward from their mid-position, the flexible arms approaching the curvature of the rotor at their extreme inward position. The contour of the vane trackway thus approximates a circle when the length of the trackway is minimum, the contour of the trackway becoming increasingly non-circular as the length thereof is increased with the track surface of each flexible arm 92 having less curvature near the end thereof adjacent the fixed abutment 75 than near its end adjacent the movable abutment 80. The dotted lines of Fig. 4 indicate the approximate relative positions of the ends of the arms 92, the members 93 and the flanges 94 when a movable abutment 80 of the present embodiment is in its respectively extreme inward and outward positions of adjustment. The flanges 94, the members 93 and the channels 97 therefore not only serve to maintain the surfaces of the arms 92 even with the arcuate surfaces 76 of the fixed abutments 75 but also impose on said arms 92 a force that modifies their deformation and contributes to control of their curvature throughout the range of their adjustment with the movable abutments 80.

By proper variation of proportions, of positional arrangements and, if desired, of force exerting mechanism the flexible arms 92 may be made to assume almost any desired configuration so that the inward and outward movement of the vanes 55 may be made to occur at practically any desired rate. The method of construction herein described has the advantage, however, of reducing to a minimum the deflection away from normal position of said arms 92 as the movable abutments 80 are moved from one to the other of their extreme positions of adjustment.

The arrangement hereinbefore described provides at any given length of the vane track and capacity of the pump a contour of the vane track such that the vanes are smoothly guided thereby in their in-and-out movement as they traverse and contact the track surface, and this is the case irrespective of the diameter of the rotor and dimensions of the corresponding vane track therefor and irrespective of the maximum "stroke" of the vanes employed, i. e., irrespective of the distance moved by the vanes in their inward or outward movement as determined substantially by the difference between the distance from the center of the rotor to the arcuate surface 76 on the fixed abutments 75 and the distance from the center of the rotor to the pumping arc 91 of the corresponding fluid section, maximum stroke being employed when said pumping arc 91 is in its maximum outward position. Practical considerations usually limit and determine, however, the maximum stroke of the vanes that may be satisfactorily employed in a pump of a given diameter, etc.; for example, one of these practical limitations might result from the maximum length of the vanes that can be accommodated in the slots of a rotor of a given diameter, or another such limitation might be the maximum acceleration that can be imparted to the vanes at the desired rotative speed and under the other conditions of operation that must be met, or such other limitations might be any of a number of others having to do with features of construction or conditions of operation; but these same limitations apply in vane pumps of constant capacity having fixed vane tracks or rings and the arrangement of the present invention by which the pump is made of variable capacity adds no limitation not otherwise existing as to the maximum stroke that may be employed. The present invention thus provides a variable capacity vane pump which gives operation that is entirely satisfactory when employing maximum strokes of the vanes as great as the strokes that may be used acceptably in comparable constant capacity vane pumps; for example, with a rotor of 3¼" to 3½" diameter the stroke of the vanes of a variable capacity pump according to the present invention, for operation at pressures up to 1000# per sq. in., may be made 3/16", ¼", or the like, as is common practice in comparable constant capacity vane pumps using rotors of comparable diameters. This is due in large part to the character of the contour of the vane track provided by the arrangement of the present invention by which the vanes are guided without abrupt changes in the velocity of their in-and-out movement at any given capacity of the pump and is in contrast with all previous variable capacity vane pumps of the mult-fluid-section type of which I am aware, as in all such previous devices the character of the contour of the vane track provided as the capacity of the pump is increased is such as to require the use of materially shorter strokes of the vanes than can be employed in a pump of the present invention of comparable size or a comparable constant capacity vane pump of the multi-fluid-section type. It is particularly important to provide proper contour of the vane track adjacent the fixed abutments as the vanes are very sensitive to changes in track outline in these regions and even small changes in contour of these portions of the vane track will materially and often adversely affect the action of the vanes and the operation of the pump. This is because the radial velocity of the vanes is then very low, so that even a small change in track contour may require a change in radial velocity which can be produced, within the time that the vane is traversing such a portion of the vane track, only by great acceleration of the vane in its radial movement. While proper vane action is important when the vanes move inward as well as when they move outward, their action during their radially outward movement is usually the most critical, as the vane track acts to move the vanes inward as rapidly as necessary as they pass through the discharge areas, during which time the vanes move inward in their slots. The vanes begin their outward movement, however, after traversing the arcuate surfaces 76 of the fixed abutments 75 with substantially no radial velocity so that, when the vanes are traversing the portions of the track adjacent the fixed abutments, relatively great acceleration is required to produce outward movement of the vanes through even the small outward distance necessary to keep the vanes in contact with the vane track (and it is practically essential for smooth and quiet operation that contact between the vanes and vane track be continuously maintained), but the force available to move the vanes outward and produce acceleration in their outward movement is usually limited and is frequently only the force produced by centrifugal action as in the present case. Improper contour of the vane track will thus usually produce unsatisfactory vane action and may also cause noisy, uneven and unsatisfactory operation of the pump, increased wear of the parts and decreased efficiency. The importance of the character of the vane track provided by the present invention will be understood from the foregoing.

Mechanism is also provided for effecting and controlling the movement of the movable abutments 80 and in the present instance comprises a pair of levers 100 pivoted on their lower ends as at 101 upon brackets 102 projecting from each side of the enclosing casing. The upper ends of the arms 100 are likewise pivotally connected with a pair of sleeve members 103 whose inner ends are internally threaded to receive the oppositely threaded ends of an adjusting rod 105 which is rotatably positioned in a slot 107 formed in a bracket on the upper end of the enclosing casing. The adjusting rod 105 is held against endwise movement by a shoulder 106 formed on said rod 105 and by the inner end of a hand wheel 108 which are positioned on opposite ends of the slot 107 and which bear against the faces of the bracket. The hand wheel 108 is keyed to the adjusting rod 105 as by the set screw 109.

Each movable abutment 80 is operatively connected with its corresponding lever 100 by its corresponding link 87 whose outer end is pivotally connected to said lever 100 intermediate its ends, as by a pin 88. The arrangement is such that clockwise rotation, as viewed from the right of Fig. 1, of the hand wheel 108 simultaneously forces the upper end of each lever 100 an equal outward distance, which in turn produces simultaneous and equal outward movement of each movable abutment 80. Similarly counterclockwise rotation of the handwheel 108 produces simultaneous and equal inward movement of each movable abutment 80. The stops 82 coming in contact with the end cover plates 36 limit the maximum outward movement of the movable abutments 80 and likewise said stops 82 coming in contact with the outer edges of the central distance pieces 70 limit the maximum inward movement.

It will be understood that other mechanism for moving the adjustable abutments 80 may be used. The mechanism disclosed moves the two abutments conjointly but this is not necessary. Variation in output can be effected by moving only one of the abutments or by unequal movement of the two abutments.

Figure 7:
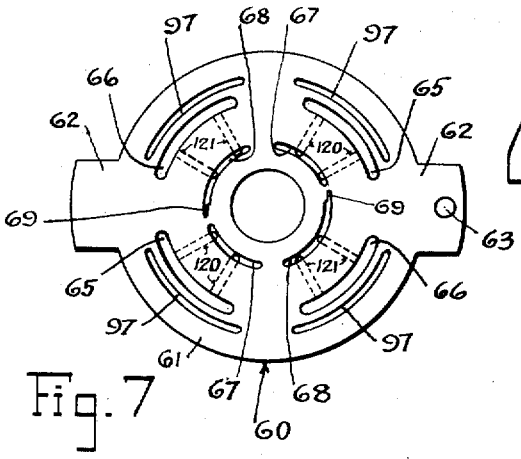
Fig. 7 shows in detail an inner elevation of another of the members, which for convenience is termed the "end plate."

Each of the end plate 60 (Figs. 1, 2, 3 and 7) is formed with a pair of diametrically oppositely positioned arcuate ports 65 which serve as the inlet or suction ports for the outer ends of the vanes and each end plate is also provided with a similar pair of arcuate ports 66 which serve as the discharge or high pressure ports; the arrangement of these ports in each end plate will be best understood from Fig. 7. These ports, which form parts of the fluid circuit, are preferably arranged so that their radially inner circumferential sides are substantially in line with the periphery of the rotor and they extend radially outward to connect with the clearance spaces on the outer circumferential surfaces of the flexible arms 92 (Fig. 3), at least near the ends thereof adjacent the fixed abutments 75, in all positions of said flexible arms 92. The inlet ports 65 and discharge ports 66 of the two end plates mate with one another so that when the parts are in position in the pump cavity 28 the inlet ports 65 of one end plate 60 are axially opposite and substantially alined with the inlet ports 65 of the other end plate and, similarly, the discharge ports 66 of the two end plates 60 are axially opposite and substantially alined with each other as may be best observed in Fig. 2. The inlet ports 65 of both end plates connect with the spaces between the outer ends of the vanes intermediate the periphery of the rotor 50 and the inner circumferential surfaces of the flexible arms 92 while said vanes are moving outward as they pass through the inlet areas, and the discharge ports 66 of both end plates 60 connect with the spaces between the outer ends of the vanes intermediate the periphery of the rotor 50 and the inner circumferential surfaces of the flexible arms 92 while said vanes are moving inward as they pass through the discharge areas of the pump. The above-mentioned clearance spaces not only connect the mating ports for the passage of fluid, as will be presently explained more fully, but also assure that the inlet ports 65 and discharge ports 66 of one end plate 60 contain fluid under the same pressures as the pressures in the mating inlet ports 65 and discharge ports 66, respectively, of the other end plate 60, so that there is substantial balance of all forces exerted in an axial direction on the rotor 50 and vanes 55 by action of pressure fluid in said ports.

The fluid circuit further comprises a pair of annular channels 110, one of which is formed in each of the casing members 20 and 21 respectively as shown in Fig. 2. In the present embodiment these channels 110 are connected with the suction or inlet ports 65 of the end plates 60 by means of ports 111 (Fig. 3) which are formed in the casing members 20 and 21 respectively and which are of substantially the same size and configuration as said ports 65. The channels 110 may be connected with the supply of fluid at any desired point and in any desired manner and in the present embodiment this is effected by means of the inlet opening 112 which connects with said channels 110 as indicated by the dotted lines in Fig. 3.

The fluid circuit also comprises a pair of annular channels 115, one of which is formed in each of the casing members 20 and 21 respectively as shown in Fig. 2. The channels 115 are, in the present instance, connected with the discharge or high pressure ports 66 of the end plates 60 by means of ports 116 (Fig. 3) which are formed in the casing members 20 and 21 respectively and which are of substantially the same size and configuration as the high pressure ports 66. Outlet for pressure fluid delivered into the channels 115 may be provided in any convenient place and manner and is here shown as comprising an outlet opening 117 which connects with said channels 115, as indicated by the dotted lines in Fig. 3. In order to provide drainage for any fluid leaking into the bores 27 and 30, the casing members 20 and 21 may also be formed with suitable drainage passages, not shown, leading from said bores 27 aand 30 and connecting with the suction channels 110 or with a drainage pipe 118.

With this arrangement the inlet ports 65 and the outlet ports 66 of only that end plate 60 which is adjacent the casing member 21 are directly connected with the fluid inlet opening 112 and fluid outlet opening 117 respectively, so that all fluid passing to and from the outer ends of the vanes 55 flows through its ports (i. e., through the ports 65 and 66 of the end plate adjacent the casing member 21). The above-mentioned clearance spaces intermediate the outer circumferential surfaces of the arms 92 and the inner circumferential surfaces of the central distance piece 70 and flanges 94 connect the inlet ports 65 in the end plate 60 adjacent the casing member 20 with the mating inlet ports 65 of the end plate 60 adjacent the casing member 21 and, similarly, said clearance spaces connect the discharge ports of the end plate 60 adjacent the casing member 20 with the mating discharge ports 66 of the end plate adjacent the casing member 21, and the arrangement is such that these clearance spaces are open for the passage of fluid at all positions of adjustment of the movable abutments 80 and flexible arms 92, particularly toward the ends of said flexible arms 92 (Fig. 3) adjacent the fixed abutments 75. Fluid passing to the spaces between the outer ends of the vanes 55 as they move through the inlet areas of the pump thus flows in through the ports 65 of both end plates 60 and, similarly, fluid discharged by the outer ends of the vanes 55 as they move through the outlet areas of the pump flows out through the ports 66 of both of said end plates 60. This arrangement has the advantage of admitting and discharging fluid from the outer ends of the vanes at both axial sides of the rotor, thus reducing the fluid speeds at these points, and also has the advantage of requiring only one inlet connection and one outlet connection between the pump and other parts of the fluid circuit. The ports 111 and 115 and the channels 110 and 116 in the casing member 20 assist in equalizing the pressures existing in the corresponding areas of the two pumping sections of the pump but said ports and passages may be omitted from the casing member 20 if desired because such equalization is also effected by the corresponding ports and channels of the casing member 21.

The fluid circuit also includes means for successively connecting the inner ends of the slots 52 of the rotor 50, as said rotor 50 revolves, with the suction and with the high pressure portions of said fluid circuit. In the present instance this is accomplished by means of two pairs of arcuate ports 67 and 68 respectively, hereinafter termed "balance ports," formed in the end plates 60. The balance ports 67 and 68 are here shown as positioned inwardly with respect to the ports 65 and 66 respectively (Fig. 7) and concentrically with respect to the inner ends of the slots 52 with which they are adapted to register as shown by dotted lines in Fig. 3.

The balance ports 67 are adapted to be connected with the inlet or suction portion of the fluid circuit and in the present embodiment this is accomplished by means of drill holes 120 in the end plates 60 extending from the suction or inlet ports 65 to said balance ports 67. Similarly the balance ports 68 are adapted to be connected with the discharge or high pressure portion of the fluid circuit and in the present embodiment this is accomplished by means of drill holes 121 in the end plates 60 which extend from the high pressure ports 66 to said balance ports 68. Balance ports 68 are shown as provided with extensions 69 which serve to connect the inner ends of the slots 52 with the high pressure portion of the fluid circuit while the vanes 55 are passing across part or all of the corresponding pumping arc 91.

This construction has several advantages. One such advantage is that the portions of the slots 52 between their inner ends and the inner ends of the vanes 55 are connected with the fluid circuit whenever any inward or outward movement of said vanes 55 is occurring, thus providing easy ingress and egress of the fluid. Another advantage is that the inner ends of the vanes 55 are supplied with fluid under the same pressure as that acting upon the outer ends of said vanes 55 whenever said vanes 55 are moving across the flexible arms 92; the vanes 55 are thus maintained substantially in hydraulic balance so that the only pressure exerted by them upon the arms 92 is the pressure created by centrifugal force plus the small amount of outward pressure brought about by the slight unbalanced effect due to the small area of the outer ends of said vanes 55 which is in contact with the interior surfaces of said arms 92. Still another advantage is that high pressure fluid is introduced behind the inner ends of the vanes 55 when said vanes begin to move across the pumping arcs 91 and before the fluid immediately ahead of said vanes 55 is connected with the high pressure portion of the fluid circuit; this tends to hold said vanes 55 firmly against the pumping arcs 51 and hence prevents the leakage of fluid past the outer ends of said vanes.

The operation of the device is as follows: The driving shaft 40 being connected with a source of power, the rotor 50 is caused to revolve and in this instance it is assumed that rotation will be in a clockwise direction as viewed in Figs. 2 and 3. It is also assumed that the inlet or suction opening 112 is suitably connected with a supply of fluid and that the outlet or discharge opening 117 is suitably connected with a reservoir or a fluid device to be operated, as the case may be. Rotation of the rotor 50 sets up centrifugal force which is exerted upon the vanes 55, causing them to tend to move outwardly and holding them against the arcuate surfaces 76 of the fixed abutments 75 and against the interior surfaces of the vane track elements 92.

For purposes of explanation, let us assume that the particular vane under consideration is opposite the midpoint of the arcuate surface 76 of one of the fixed abutments 75. As shown in Figs. 1 and 3, the vane 55 will then be in its extreme inward position in its slot 52 where it will remain as long as its outer end is in contact with the arcuate surface 76. While still in this extreme inward position the vane 55 moves across the joint made by the tongue 77 of the fixed abutment 75 and the forked end of the adjacent arm 92 and hence moves onto the interior surface of said arm 92 where it begins its outward movement. This outward movement continues as the vane 55 is moved along on the arm 92 and occurs as rapidly as the contour of the inner surface of said arm 92 will permit, preferably reaching its extreme outward position at or about the point where said vane 55 enters the adjacent pumping arc 91.

It will be observed that outward movement of the vane 55 takes place while said vane is passing through a portion of the pump cavity which is connected through one of ports 65 with the inlet or suction portion of the fluid circuit and it is intended that said inlet or suction portion of the fluid circuit and its connected portions of the pump cavity shall be kept completely filled with fluid; under ordinary circumstances this will be accomplished by the suction effect produced by the action of the vanes 55 as the rotor 50 revolves, though gravity or other pressure means may be employed if desired. The leading and trailing faces of the vane 55 are therefore acted upon and exposed to fluid of uniform pressure as said vane 55 begins and as long as it continues its outward movement; the vane 55 is therefore hydraulically balanced and moves freely and easily in its slot 52, with no appreciable tendency to bind.

As the rotor 50 continues its rotation, the vane 55 passes from the inner end of the arm 92 onto and through the adjacent pumping arc 91. It will be observed that the space between a pair of adjacent vanes 55 (i. e., the particular vane 55 under consideration and the vane 55 immediately preceding it) is kept in fluid connection with the corresponding mating pair of inlet or suction ports 65 throughout the time that the leading vane of such pair is passing from the arcuate surface 76 of the fixed abutment 75 to the adjacent pumping arc 91, the mating pair of inlet ports 65 in the two end plates 60 being connected through the fluid connection existing on each side of the arm 92 as hereinbefore explained; this arrangement assures that the pumping space between such a pair of vanes and between the periphery of the rotor 50 and the pumping arc 91 is completely filled with fluid.

Pumping is accomplished as the vane 55 moves across the pumping arc 91 and thus forces the fluid immediately ahead of said vane 55 into the high pressure or discharge portion of the pump cavity, whence it passes through one of ports 66 and through and out of the other high pressure or discharge portions of the fluid circuit already described. It will be observed that there will be absolutely no radial movement of the vane 55 while passing across the pumping arc 91 when the movable abutment 80 is in such position of adjustment that said arc 91 is concentric with the rotor 50; in other positions of adjustment of said movable abutment 80 there will, theoretically, be a very small radial movement of said vane 55 as it passes across said arc 91 but in practice this movement is negligible. The approximate amount of such movement of the vane 55 can be observed from Fig. 4 in which the full line drawing of the movable abutment 80 employed in the present embodiment shows the arc 91 in its concentric position while the inner and outer dotted lines show the relative positions of said arc 91 with respect to the axis of the rotor 50 when said movable abutment 80 is in its respectively extreme inward and outward positions of adjustment. By varying the number of vanes 55 and altering the proportions of the parts this radial movement may be held within almost any desired limits.

As the vane 55 leaves the pumping arc 91 it passes onto the inner surface of the inner end of the adjacent arm 92 and into a portion of the pump cavity containing relatively high pressure fluid. The vane 55 now begins its inward movement which continues as it travels along the inner surface of the arm 92 until said vane 55 is in its extreme inward position in its slot 52 as it approaches the outer end of said arm 92, whence it passes across the joint formed by the forked end of said arm 92 and the tongue 77 of the adjacent fixed abutment 75 and onto the arcuate surface 76 of said fixed abutment 75. As in the case of the outward movement of the vane 55 and by means of similar fluid connections, the leading and trailing faces of said vane 55 are exposed to fluid under uniform pressure, and hence hydraulically balanced, whenever such inward movement is taking place.

It will be observed that the particular vane under consideration has now traveled through a distance of 180° and the cycle already described will be repeated through the succeeding 180° of the vane's travel. Each vane 55 therefore undergoes two complete reciprocations and performs two pumping operations for each revolution of the rotor 50, so that the pump is what is frequently termed the "double acting" type. It will also be observed that the pump comprises a pair of suction or low pressure areas and a pair of discharge or high pressure areas, the respective members of which pairs are positioned diametrically opposite each other; and it will be further observed that the arrangement is such that for each portion of the rotor 50 exposed to fluid acting upon it in one direction there is a corresponding and equal area of said rotor 50 exposed to fluid under same pressure but acting upon said rotor 50 in the opposite direction. The entire rotor 50 is therefore in hydraulic balance.

It will still further be observed that the flexible arms 92 are likewise in hydraulic balance and are subject to no outward force except the small amount imposed by the vanes 55, as hereinbefore explained.

This balance of the hydraulic pressures on arms 92 is produced by the admission of pressure fluid to both the inner and outer surfaces of arms 92 by the inlet ports 65 and the outlet port 66 (see Figs. 3 and 1).

The movable abutments 80 are, however, not in hydraulic balance since the rectangular portion 81, i. e., the horizontal member, is directly behind the pumping arc or pumping space 91. Therefore whenever any part of the pumping arc is connected with the high pressure portion of the fluid circuit, there will be a force acting to push the movable abutments outwardly. With the vanes in the position shown in Fig. 3, there will be no outward force exerted upon the movable abutment because the pumping arc is then disconnected from both the high and low pressure portions of the circuit. When the lower of the pair of vanes opposite arc 91 moves down so as to connect with the valve port 66, however, all the fluid between this lower vane and the vane immediately at the rear thereof will be put under high pressure. This will act upon the pumping arc 91 and attempt to push it outward, the area of pumping arc 91 thus acted upon decreasing as the second of this pair of vanes travels downward.

The capacity or output of the pump per revolution is varied by changing the size of the pumping spaces by altering the positions of the movable abutments 80 with respect to the rotor 50 and, as herein before explained, this is accomplished by rotation of the hand wheel 108. The capacity per revolution of the pump varies in proportion to the distance of the pumping arcs 91, and hence of the movable abutments 80, from the periphery of the rotor 50 and as this distance may be varied in infinitely small increments, the capacity per revolution of the pump may likewise be varied from maximum to minimum. The length of the path of travel of the outer ends of the vanes along the vane trackway 55 per revolution of the rotor 50 is increased or decreased as the movable abutments 80 are moved outwardly or inwardly respectively. The minimum capacity per revolution may be made zero by proper proportioning of the parts.

In assembling the pump, an end plate 60 is first put into place in the pump cavity 28 and adjacent the face 29 of the casing member 20. The two central distance pieces 70 and the two movable abutments 80 are then assembled so that the tongues 77 extend into the slots 95 and so that the rectangular portions 81 are in proper position between the opposing ends 71 of the central distance pieces 70; these parts thus assembled are then put into place in the pump cavity 28, care being used so that the flanges 94 are received within the channels 97 of the end plate 60 already put into place. The rotor 50 is then assembled with its vanes 55 in their corresponding slots 52 and this assembly is then put into place. The driving shaft 40 is next inserted in the bore of the rotor 50 and is keyed to said rotor by the keys 45; the bearing member 41 is then inserted in the bore 27 and is located by closing said bore 27 with its cover plate 32. The second end plate 60 is then put into place, care again being used so that the flanges 94 are received into the channels 97. The bearing member 42 is then placed upon the rear end of the driving shaft 40 and the cover member 21 is then put into place and securely fastened by means of the screws 24. The end of the bore 30 is then closed by means of the cover plate 34 and the bearing member 42 thus positioned against the shoulder 44 of the driving shaft 40. The movable abutments 80 are then connected with the adjusting mechanism in a manner which will be obvious.

The pump herein described possesses numerous advantages. Among these are that it is compact and sturdy. It is simple in design and its component parts are likewise simple and adapted for quantity production, all of which results in low cost. Its parts may readily be held to close limits so that said parts will be interchangeable and not require hand fitting. Substantially all movement of the working parts occurs when such working parts are hydraulically balanced, thus reducing friction and wear. Other advantages will be readily apparent to those skilled in the art.

It will be understood that the rotor and vanes are balanced axially and that hydraulic balance of the forces acting on the rotor in a radial direction is obtained by arranging the inlet and outlet ports in pairs, one port of each pair being arranged diametrically opposite the other, and also arranging the pumping arcs 91, diametrically opposite each other so that the moment on one side of the rotor axis is balanced by a similar moment diametrically opposite. This places the rotor in balance and relieves both the rotor bearings and the driving shaft bearings of pumping pressure. It will be further understood, however, that, if desired, only a single fixed abutment and a single movable abutment, i. e., a single pumping space may be employed.

In the foregoing description it has been assumed that the speed of the rotor 50 is such that the resulting centrifugal force exerted upon the vanes 55 will be sufficient to hold said vanes 55 outwardly against the arcuate surfaces 76 of the fixed abutments 75 and against the interior surfaces of the arms 92. In almost all instances this will be the case in ordinary practice but if it is desired to operate the pump at lower speeds appropriate means may be introduced to hold said vanes 55 outwardly.

While the device has been described as a pump, it will also function as a fluid motor if supplied with pressure fluid for its operation. The cycle of operation will, of course, be reversed. When employed as a motor it may be desired to locate the slots 52 in truly radial position with respect to the rotor 50, particularly if the motor is intended to be operated in both directions of rotation. Likewise it may be desired to introduce means tending to hold the vanes 55 outwardly, particularly if the motor is intended to be operated at low rotative speeds.

It is to be understood that the foregoing is merely an exemplifying disclosure, and that changes may be made in the apparatus without departing from the applicant's invention which is defined in the appended claims.

I claim:

1. In a rotary pump or motor of variable capacity, a rotor, a plurality of vanes movable inwardly and outwardly in slots of said rotor, a track of variable circumferential length having a surface for guiding the ends of the vanes in their in-and-out movement, and means for simultaneously varying the circumferential length of the track and the capacity of the pump or motor, said track including a flexible portion bendable to varying degrees as the circumferential length of the track is varied, said bendable portion having non-uniformly distributed resistance to deformation whereby the bending thereof in unison with change in length of said track deforms said bendable portion to give the right curvature to produce a smooth guiding of the vanes at any given capacity of the pump or motor.

2. In a rotary pump or motor of variable capacity, a rotor, a plurality of vanes movable inwardly, and outwardly of said rotor, a trackway for said vanes of variable length comprising two parts, and means for varying the length of said trackway as the capacity of the pump or motor is varied, at least one of said two parts of the trackway being movable with respect to the other part, and at least one of said parts including a flexible portion bendable to varying degrees as the length of the trackway is varied, to cooperate with said other part to maintain a smooth track surface for said vanes, said flexible portion being provided with a curved track surface having at least two radii of curvature when said flexible portion is free from force tending to change the curvature thereof.

3. In a rotary pump or motor of variable capacity, a casing, a rotor within the casing, a plurality of vanes movable inwardly and outwardly of the rotor, a working chamber between the rotor and a part of the casing, the working chamber having a fluid inlet and a fluid outlet, means for regulating the extent of the in-and-out movement of the vanes during a pumping cycle to vary the capacity of the working chamber of the pump or motor, said means including a track of variable circumferential length for the outer ends of the vanes, said track including a flexible portion bendable to varying degrees as the in-and-out movement is varied, and means for varying the circumferential length of the track and positively controlling the bending of the flexible portion, including means for simultaneously exerting at least two bending forces on said flexible portion.

4. In a rotary pump or motor of variable capacity, a casing, a rotor within said casing, a plurality of vanes movable inwardly and outwardly of said rotor, a working chamber between the rotor and a part of the casing, said working chamber having a fluid inlet and a fluid outlet, means for regulating the extent of the in-and-out movement of the vanes during a pumping cycle to vary the capacity of the working chamber of the pump or motor, a track of variable circumferential length for the outer ends of the vanes, means for varying the circumferential length of said track, said track including a flexible portion bendable to varying degrees as the in-and-out movement is varied, and means for bending said flexible portion and for maintaining the curvature thereof such that the acceleration and deceleration of the vanes in their in-and-out movement is substantially uniform at any given capacity of the pump or motor.

5. In a rotary pump or motor of variable capacity, a rotor, a plurality of vanes movable inwardly and outwardly of said rotor, and a trackway for said vanes including a stationary track element and a track element movable to vary the capacity of said pump or motor, said movable track element having a substantially rigid portion and a flexible portion having an end slidably connected to the stationary track element, guide means carried by said flexible portion near the end thereof adjacent said stationary element and guiding means for said guide means having two parts positioned opposite one another, one of said parts acting together with said guide means to locate the end of said flexible portion in vane-transferring relation with said stationary element and the other of said parts cooperating with said guide means to simultaneously provide constrained motion of said guide means and of said end of said flexible portion to aid in controlling the curvature of said flexible portion.

6. In a rotary pump or motor of variable capacity, a rotor, a plurality of vanes movable inwardly and outwardly of said rotor, and means for varying the capacity of said pump or motor including a trackway for said vanes comprising a stationary element having a vane track surface of fixed curvature and an element movable with respect thereto to alter the capacity of the pump or motor and to vary the circumferential length of said trackway, said movable element having a flexible portion overlapping a portion of said stationary element in all positions of said movable element and said flexible portion having a track surface formed with a contour of less curvature adjacent the end thereof overlapping said stationary element than adjacent the end thereof contiguous to the movable element.

7. In a rotary pump or motor of variable capacity, a rotor, a plurality of vanes movable inwardly and outwardly of said rotor, a trackway for said vanes comprising a pair of cooperating elements having overlapping track surfaces, one of which includes a flexible part of non-uniform thickness, means for moving one of said elements with respect to the other to vary the capacity of the pump or motor and to vary the circumferential length of the trackway, and means for maintaining the overlapping track surfaces in vane transfering relation with one another including a guide surface for the element which has the flexible part, said guide surface being disposed outwardly in a generally radial direction from the overlapping track surfaces a distance greater than the minimum thickness of said flexible part.

8. In a rotary pump or motor of variable capacity, a rotor, a plurality of vanes movable inwardly and outwardly of said rotor, a track having a surface adapted to contact the exposed ends of said vanes, said track comprising a flexible member and a rigid member, means for bodily moving one of said members with respect to the other to vary the circumferential length of the track, means for flexing said flexible member to maintain the track surfaces of said members even at their juncture in all positions of relative movement between said members, and means for additionally flexing said flexible member conformably to the position to which said members are adjusted relative to each other.

9. In a rotary pump or motor of variable capacity, a rotor, a plurality of vanes movable inwardly and outwardly of said rotor, a track for said vanes comprising a rigid element and a flexible element, said elements having surfaces adapted to contact the vanes, means for moving one of said elements with respect to the other to vary the capacity of the pump or motor and to vary the circumferential length of said track with the surfaces of the flexible and rigid elements maintained in vane transferring relation with each other, and means actively responsive to relative movement between said elements for exerting two forces simultaneously upon said flexible element to alter its shape.

10. In a rotary pump of variable capacity, a casing, a rotor within said casing, a plurality of vanes movable inwardly and outwardly of said rotor, a working chamber between the rotor and a part of the casing, said chamber having a fluid inlet and a fluid outlet, a track of variable circumferential length coacting with the ends of the vanes, said track including a member adjustable to vary the capacity of said chamber and a deformable part adjacent said inlet for limiting the outward position of said vanes during intake, means for varying the circumferential length of said track as the capacity of said working chamber is varied, means for adjusting simultaneously said adjustable member and said deformable part, said means also acting to control the curvature of the inner face of said deformable part upon adjustment of said adjustable member to provide a contour of said deformable part such that the acceleration of the vanes in their outward movement with respect to the rotor is substantially uniform at any given capacity of the pump or motor.

11. In a rotary pump or motor of variable capacity, a casing, a rotor within said casing, a plurality of vanes movable inwardly and outwardly of said rotor, a working chamber of variable capacity between the rotor and a part of the casing, said chamber having a fluid inlet and a fluid outlet, a track of variable circumferential length coacting with the ends of the vanes and arranged to produce a complete cycle of inward and outward movement of said vanes as said vanes rotate in unison with said rotor through an arcuate distance not exceeding 180°, said track including a part adjustable radially to vary the capacity of said pump or motor and a curved flexible element connected therewith, and means for exerting force upon said flexible element in an inward radial direction to increase the curvature thereof as said part is adjusted to shorten the circumferential length of the track and decrease the capacity of the working chamber, said last named means exerting force upon said flexible element in an outward radial direction to decrease its curvature as said port is adjusted to increase the circumferential length of the track and the capacity of the working chamber.

12. In a rotary pump or motor of variable capacity, a rotor, a plurality of vanes movable inwardly and outwardly of said rotor, a trackway for said vanes including a stationary element, an element movable to vary simultaneously the capacity of said pump or motor and the length of the trackway, and a flexible member fixed to one of said elements and having an extensible connection with the other of said elements, said flexible member having a non-uniform thickness intermediate said elements and arranged to produce deformation of certain portions of said flexible member to an extent exceeding the corresponding deformation of other portions thereof upon movement of said movable element, whereby at all capacities of the pump or motor said vanes are guided in their in-and-out movement without abrupt change in the velocity thereof.

13. In a rotary pump or motor of variable capacity, a rotor, a plurality of vanes movable inwardly and outwardly of said rotor, a trackway for said vanes including a stationary element, an element movable to vary the capacity of said pump or motor and to vary the circumferential length of said trackway, a flexible member fixed to one of said elements and having an extensible connection with the other of said elements together with means for maintaining said elements in vane transferring relation with one another at said extensible connection to form a smooth and substantially continuous trackway from one of said elements to the other for said vanes in all positions of said movable element, and including constraining means for altering the configuration of said flexible member to control the rate of movement of said vanes in said slots.

14. In a vane type pump or motor of variable output having inlet and discharge chambers, a rotor having a plurality of vane slots, vanes in said slots, a stationary abutment cooperating with said vanes to separate discharge and inlet chambers, a movable abutment cooperating with said vanes to separate inlet and discharge chambers, means for altering the position of said movable abutment to alter the volume of fluid transferred from an inlet chamber to a discharge chamber, a track element connecting said abutments having a flexible portion and having an extensible connection with one of said abutments, and means including non-uniform resistance to bending of said flexible portion for controlling the flexing of said flexible portion conformably to the adjustment of said movable abutment.

15. In a rotary pump or motor of variable capacity, a rotor, a plurality of vanes movable inwardly and outwardly of said rotor, a track having a surface adapted to contact the exposed ends of said vanes, said track including a stationary rigid element, a rigid element movable to vary the capacity of the pump or motor, and an intermediate flexible element, means for moving said movable rigid element, means for causing said movement to produce relative sliding movement between said flexible element and one of said rigid elements in a predetermined path to vary the circumferential length of said track and maintain the vane contacting surfaces of said elements even with one another, and including a plurality of separate means for exerting curvature changing forces upon said flexible element to alter its curvature simultaneously with the movement of said movable element.

16. In a rotary pump or motor of variable capacity, a rotor, a plurality of vanes movable inwardly and outwardly of said rotor, and a track having a track surface for guiding the ends of said vanes comprising a stationary rigid element, a rigid element movable with respect thereto to adjust the capacity of the pump or motor, and an intermediate flexible element adapted to connect said movable and stationary elements, said flexible element having an extensible connection with one of said rigid elements including mutually overlapping track surfaces whereby movement of the movable element to vary the pump or motor capacity alters the circumferential length of the track, and means for maintaining substantially the entire overlapping portion of the track surface of said intermediate flexible element alined and substantially concentric with the track surface of said rigid element at all lengths of the track and at all capacities of the pump or motor.

17. In a rotary pump of variable capacity, a casing, a rotor within said casing, a plurality of vanes movable inwardly and outwardly of said rotor, a working chamber between the rotor and a part of the casing, said chamber having a fluid inlet and a fluid outlet, a track of variable circumferential length coacting with the ends of the vanes, said track including a member adjustable to vary the capacity of said chamber and a deformable part adjacent said inlet which limits the outward position of said vanes during intake, means for varying the circumferential length of said track as the capacity of the working chamber is varied, means for adjusting simultaneously said adjustable member and said deformable part said means also acting to control the curvature of the inner face of said deformable part upon adjustment of said adjustable member and said part to provide a contour of said deformable part such that the deceleration of the vanes in their outward movement with respect to the rotor is substantially uniform at any given capacity of the pump or motor.

18. In a variable capacity pump or motor, a rotary assembly including a rotor and substantially radially movable vanes, a casing therefor including a first abutment having a track surface coacting with a portion of the peripheral surface of the rotary assembly, a second abutment having a track surface coacting with the vanes at another portion of said rotary assembly and adjustable radially with respect thereto, one of said abutments having a flexible projection extending in an approximately circumferential direction to the other of said abutments and forming a trackway element connecting said abutments to guide said vanes radially as they pass therebetween, means for maintaining the track surface of said projection adjacent an end thereof in such relationship to the track surface of its contiguous abutment that said track surfaces always have a common tangent therebetween at all positions in the range of adjustment of the movable abutment as said abutment is adjusted to vary the capacity of the pump or motor, and an inlet and outlet for admitting and discharging fluid to and from said vanes.

19. In a variable capacity pump or motor, a casing forming a pump chamber, a rotary assembly smaller than said chamber including a rotor and substantially radially movable vanes, two stationary members projecting into said chamber from opposite sides of the rotary assembly and dividing the chamber into two pumping sections, each of said stationary members having a track surface coacting with a portion of the peripheral surface of the rotary assembly, two radially movable members each also having a track surface coacting with the ends of the vanes of another portion of the rotary assembly, said movable members projecting into said chamber from opposite sides of said rotor intermediate said stationary members and dividing each of said pumping sections into an inlet portion, a pumping space and an outlet portion, said pumping space being substantially opposite the inner ends of said radially movable members, each of said radially movable members having a pair of flexible resilient projections extending throughout one of said inlet and outlet portions respectively to a point adjacent said stationary members, said projections forming trackway elements for guiding said vanes in their inward and outward radial movement as they pass between said stationary and movable members, means for adjusting the radial position of said movable members to vary the capacity of said pump or motor, and means for bending said flexible projections to maintain a portion of the track surface adjacent the end of each of said projections in such relation to the track surface of the stationary member adjacent thereto that said track surfaces have a common tangent at every position of said movable members, whereby said vanes pass smoothly to and from said stationary members without abrupt changes in radial velocity.

20. In a rotary pump or motor of variable capacity, a rotor, a plurality of vanes movable inwardly and outwardly of said rotor, a track having a surface adapted to contact the exposed ends of said vanes to act thereon to control the reciprocation thereof, said track including an element adjustable to vary the capacity of said pump or motor, and a curved flexible element connected therewith, said flexible element being free from force tending to change its curvature when in an intermediate position of adjustment, means for moving said adjustable element, mechanical means for exerting force upon said flexible element in a direction tending to increase its curvature when said adjustable element is moved in one direction away from said force-free position, and mechanical means for exerting force upon said flexible element in a direction tending to decrease its curvature when said adjustable element is moved in the opposite direction away from said force-free position.

21. In a rotary pump or motor of variable capacity, a rotor, a plurality of vanes movable inwardly and outwardly of said rotor, a track having a surface adapted to contact the exposed ends of said vanes to act thereon to control the reciprocation thereof, said track including an element movable to vary the capacity of said pump or motor and a curved flexible element connected therewith, said flexible element being free from force tending to change its curvature when in an intermediate position of adjustment, means for moving said movable element with respect to said flexible element to flex said flexible element and to vary the circumferential length of said track, and means simultaneously exerting force upon said flexible element in a direction tending to vary its curvature to maintain said controlling action on the vanes in all positions to which said flexible element is adjusted from said force-free position.

22. In a variable capacity pump or motor, a rotary assembly including a rotor and substantially radially movable vanes, a casing therefor including a first abutment having a track surface coacting with a portion of the peripheral surface of the rotary assembly, a second abutment having a track surface coacting with the vanes at another portion of said rotary assembly and adjustable radially with respect thereto, one of said abutments having a flexible projection extending in an approximately circumferential direction to the other of said abutments and forming a trackway element connecting said abutments to guide said vanes radially as they pass therebetween, and a substantially rigid member connected with said flexible projection at a point near the end thereof and extending outward therefrom in a generally radial direction with respect to the rotor, an arm non-radially disposed with respect to the rotor and extending from said rigid member, a guide therefor whereby when said movable abutment is adjusted radially the vane guiding surface of said flexible projection adjacent an end thereof is maintained in vane transferring relation with the track surface of its contiguous abutment and the configuration of the trackway is modified, and an inlet and outlet for admitting and discharging fluid to and from said vanes.

23. In a variable capacity pump or motor, a rotary assembly including a rotor and substantially radially movable vanes, a casing therefor including walls on each side of said rotary assembly, a fixed abutment having a track surface coacting with a portion of the peripheral surface of the rotary assembly, a movable abutment having a track surface coacting with the vanes at another portion of the rotary assembly and adjustable radially with respect thereto to vary the volume of the pumping space between adjacent vanes in contact with said abutment, said movable abutment having a flexible projection extending in a substantially circumferential direction to said fixed abutment, a rigid member operatively connected with said flexible projection near the end thereof adjacent said fixed abutment, a curved arm concentric with the axis of said rotor attached to said rigid member, a guideway in each of said walls for receiving the edge of said curved arm whereby the inner surface of said flexible projection adjacent the end thereof is maintained even with the corresponding track surface of said fixed abutment and the configuration of said flexible projection is modified and coordinated with the radial position of said movable abutment to cause said vanes to reciprocate without abrupt changes in the velocity of their radial movement, and an inlet and outlet for admitting and discharging fluid to and from said vanes.

24. In a rotary pump or motor of variable output, a rotor, a plurality of vanes movable inwardly and outwardly of said rotor, a track for exerting guiding action on said vanes comprising a rigid element and a flexible element having an extensible connection therebetween including overlapping parts, said track being arranged to produce a complete cycle of inward and outward movement of said vanes as said vanes are rotated in unison with said rotor through an arcuate distance not exceeding 180°, means for moving one of said elements with respect to the other to vary the output of the pump or motor and the length of said track, and means actuated simultaneously with said moving means for maintaining said overlapping parts in vane transferring relation with one another and for flexing said flexible element to produce at any given output of the pump or motor a smooth guiding of the vanes without abrupt change in the velocity of their in-and-out movements said vanes traverse any point of said track, irrespective of the length of the stroke of said vanes in said in-and-out movement.

25. In a rotary pump or motor of variable output, a rotor, a plurality of vanes movable inwardly and outwardly of said rotor, a track having a surface adapted to contact the exposed ends of said vanes to guide the same in their in-and-out movement, said track including a stationary element of fixed curvature also a rigid element of fixed curvature which is movable to vary the output of the pump or motor and an intermediate flexible element, said track being arranged to produce one complete reciprocation of the vanes in their in-and-out movement during approximately one-half of a revolution in their rotary movement with the rotor, means for adjusting said movable element to vary said output, an extensible connection including overlapping parts between said flexible element and one of said elements of fixed curvature, and means acting simultaneously with the adjustment of said movable element for maintaining the overlapping parts of said extensible connection in smooth vane-transferring relation with one another, with the flexible element cooperating with the contiguous element to provide at and adjacent said extensible connection a track contour producing a smooth guiding action of the vanes at every position of adjustment of said movable element without abrupt change in the velocity of the vanes in their in-and-out movement as the ends of said vanes traverse said extensible connection and the portions of the track adjacent thereto, without limitation as to the length of the stroke of the vanes in their in-and-out movement.

26. In a rotary pump or motor of variable capacity, a rotor, a plurality of vanes movable inwardly and outwardly of said rotor, a trackway for said vanes including stationary means, means movable to vary simultaneously the capacity of said pump or motor and the length of the trackway, and a pair of flexible members having extensible connections with one of said means, said trackway having a variable contour that approximates a circle when the length of said trackway is minimum and that becomes increasingly non-circular as the length of said trackway is increased with the track surface of each flexible member having formed with less curvature near the end thereof adjacent said stationary means than near the end thereof adjacent said movable element.

27. In a rotary pump or motor of variable capacity, a rotor, a plurality of vanes movable inwardly and outwardly of said rotor, a trackway for said vanes including stationary means, means movable to vary simultaneously the capacity of said pump or motor and the length of the trackway, and a pair of flexible members each having an extensible connection with one of said means, each flexible member having inherent therein resistance to bending non-uniformly distributed lengthwise thereof.

28. In a rotary pump or motor of variable capacity, a rotor, a plurality of vanes movable inwardly and outwardly of said rotor, and means for varying the capacity of said pump or motor including a trackway for said vanes comprising a stationary element having a vane track surface of fixed curvature concentric with the rotor and an element movable with respect thereto to alter the capacity of the pump or motor and to vary the circumferential length of said trackway, said movable element having a flexible portion overlapping the contiguous portion of said stationary element in all positions of said movable element, and a guideway for the end of said flexible element adjacent said stationary element, said guideway being concentric with the rotor and arranged to maintain the track surface on the overlapping portion of said flexible element substantially concentric with said rotor at all capacities of the pump or motor, whereby there is substantially no movement of said vanes relative to said rotor as the outer end of said vanes traverse said overlapping portion of said flexible element.

29. In a rotary pump or motor of variable capacity, a rotor, a plurality of vanes movable inwardly and outwardly of said rotor, a track for said vanes comprising a rigid element and a flexible element, said elements having surfaces adapted to contact the vanes, means for moving one of said elements with respect to the other to vary the capacity of the pump or motor and the circumferenial lengh of said track, together with means acting simultaneously with relative movement between said elements for imparting to said flexible element a deformation of one character, and means also active simultaneously with said relative movement for modifying said first named deformation.

30. In a rotary pump or motor of variable capacity, a rotor, a plurality of vanes movable inwardly and outwardly of said rotor, a track for said vanes comprising a rigid element and a flexible element, said elements having surfaces adapted to contact the vanes, means for moving one of said elements with respect to the other to vary the capacity of the pump or motor and the circumferential length of said track, together with means acting simultaneously with relative movement between said elements for imparting to said flexible element a deformation of one character, and means also active simultaneously with said relative movement for modifying said first named deformation, including means active throughout at least a portion of said relative movement to impose on said flexible element a bending force tending to decrease the curvature of at least a portion thereof.

31. In a rotary pump or motor of variable capacity, a rotor, a plurality of vanes movable inwardly and outwardly of said rotor, a track for said vanes comprising a rigid element and a flexible element, said elements having surfaces adapted to contact the vanes, means for moving one of said elements with respect to the other to vary the capacity of the pump or motor and the circumferential length of said track, together with means acting simultaneously with relative movement between said elements for imparting to said flexible element a deformation of one character, and means also active throughout at least a portion of said relative movement to modify said first named deformation by increasing the curvature of at least a portion of said flexible element.

32. In a rotary hydraulic pump or motor of variable capacity, a rotor having a plurality of vanes movable inwardly and outwardly thereof, a casing surrounding said rotor and vane assembly, a fluid circuit having a fluid inlet opening and a fluid outlet opening, a vane trackway of variable circumferential length having a track surface for guiding the ends of said vanes in their in and out movement comprising a fixed section and a movable section, said movable section having an extensible connection with said fixed section and being bendable as the length of said trackway is altered to cooperate with said fixed section to maintain a smooth track surface at different capacities of said pump or motor, said movable section being radially spaced from said casing to provide a clearance space therebetween at least at points near the end of said movable section adjacent said fixed section, a pair of mating ports disposed one on each axial side of said rotor, said ports each being connected with said clearance space and with the ends of said vanes as they move across the track surface of said movable section, only one port of said pair being directly connected with one of said openings and the other port of said pair being connected with said opening solely through said clearance space and the space intermediate said rotor and the track surface of said movable section, and means for moving said movable section to simultaneously vary the capacity of the pump or motor and the length of the trackway.

33. In a variable capacity vane type rotary pump or motor, a casing, a rotor having a plurality of vanes, a circumferentially variable length track having two diametrically opposed fixed track surfaces disposed closely adjacent the rotor periphery, a movable track surface and a pair of flexible track sections disposed on opposite sides of said movable surface and connecting the latter with the corresponding fixed surface in vane transfer relation therewith in all positions of the movable surface, each of said flexible track sections having non-uniformly distributed resistance to bending, said track assuming a more nearly semi-circular contour as the movable surface is moved toward the rotor to decrease the stroke.

34. In a variable capacity rotary vane type pump or motor having a plurality of fluid sections, a rotor, a plurality of vanes movable inwardly and outwardly of the rotor in a substantially radial direction and a trackway of variable circumferential length for said vanes, said trackway comprising oppositely positioned pairs of movable and fixed abutments and flexible track means having vane contacting surfaces formed with non-uniform curvature and bendable to varying degrees as said movable abutments are moved, said flexible track means connecting said fixed and movable abutments in all positions of said movable abutments, together with means for maintaining the vane contacting surfaces on said flexible track means and on said abutments in vane transferring relation with one another at the connections therebetween.

HUGO A. CENTERVALL.

14

CERTIFICATE OF CORRECTION.

Reissue No. 22,159. August 18, 1942.

HUGO A. CENTERVALL.

It is hereby certified that error appears in the printed specification of the above numbered patent requiring correction as follows: Page 3, second column, line 12, for the word "arm" read --arms--; page 5, first column, line 33, for "mult-fluid-section" read --multi-fluid-section--; and second column, line 25, for "shoulder 108" read --shoulder 106--; page 7, first column, line 30, for "arcs 51" read --arcs 91--; page 10, first column, line 75, claim 11, for "port" read --part--; page 12, second column, line 5, claim 24, for the words "movements said" read --movement as said--; line 54, claim 26, strike out "having"; and that the said Letters Patent should be read with this correction therein that the same may conform to the record of the case in the Patent Office.

Signed and sealed this 6th day of October, A. D. 1942.

Henry Van Arsdale,
Acting Commissioner of Patents.

(Seal)